(12) United States Patent
Tamaki

(10) Patent No.: US 8,786,530 B2
(45) Date of Patent: Jul. 22, 2014

(54) DISPLAY DEVICE AND ELECTRONIC APPARATUS

(75) Inventor: Masaya Tamaki, Kanagawa (JP)

(73) Assignee: Japan Display West Inc., Tokyo (JP)

( * ) Notice: Subject to any disclaimer, the term of this patent is extended or adjusted under 35 U.S.C. 154(b) by 138 days.

(21) Appl. No.: 13/495,336

(22) Filed: Jun. 13, 2012

(65) Prior Publication Data

US 2012/0320025 A1    Dec. 20, 2012

(30) Foreign Application Priority Data

Jun. 20, 2011   (JP) ................................. 2011-136568

(51) Int. Cl.
*G09G 3/36* (2006.01)
*G09G 5/00* (2006.01)
*G06F 3/038* (2013.01)

(52) U.S. Cl.
USPC ........................................... 345/87; 345/212

(58) Field of Classification Search
USPC .................................................. 345/87, 212
See application file for complete search history.

(56) References Cited

U.S. PATENT DOCUMENTS

| | | | | |
|---|---|---|---|---|
| 5,691,783 | A * | 11/1997 | Numao et al. | 345/92 |
| 6,496,177 | B1 * | 12/2002 | Burton | 345/87 |
| 2007/0229447 | A1 * | 10/2007 | Takahara et al. | 345/102 |

FOREIGN PATENT DOCUMENTS

| | | |
|---|---|---|
| JP | 08-152601 A | 6/1996 |
| JP | 2771392 B2 | 4/1998 |
| JP | 11-271742 A | 10/1999 |
| JP | 2004-078249 A | 3/2004 |
| JP | 2005-122110 A | 5/2005 |
| JP | 2008-299114 A | 12/2008 |
| JP | 2010-122695 A | 6/2010 |

OTHER PUBLICATIONS

Japanese Office Action mailed Apr. 22, 2014 in connection with Japanese Application No. 2011-136568, and English translation thereof.

\* cited by examiner

*Primary Examiner* — Kevin M Nguyen
(74) *Attorney, Agent, or Firm* — Wolf, Greenfield & Sacks, P.C.

(57) ABSTRACT

A display device includes: a liquid crystal display panel; and a driver circuit that drives the liquid crystal display panel. The liquid crystal display panel includes a liquid crystal layer, pixel electrodes provided in a region facing the liquid crystal layer and which apply a voltage thereto, and a phase difference layer and a polarizing plate each provided on a side, relative to the liquid crystal layer, which ambient light enters. Each of the pixel electrodes includes a plurality of partial electrodes, and the driver circuit selects one or more partial electrodes from the partial electrodes to which a constant voltage is to be applied in accordance with an image signal. The constant voltage causes the liquid crystal display panel to be in a white state. The driver circuit performs gray-scale display by modulating lighting area of each pixel at a frame rate of less than 60 Hz.

7 Claims, 11 Drawing Sheets

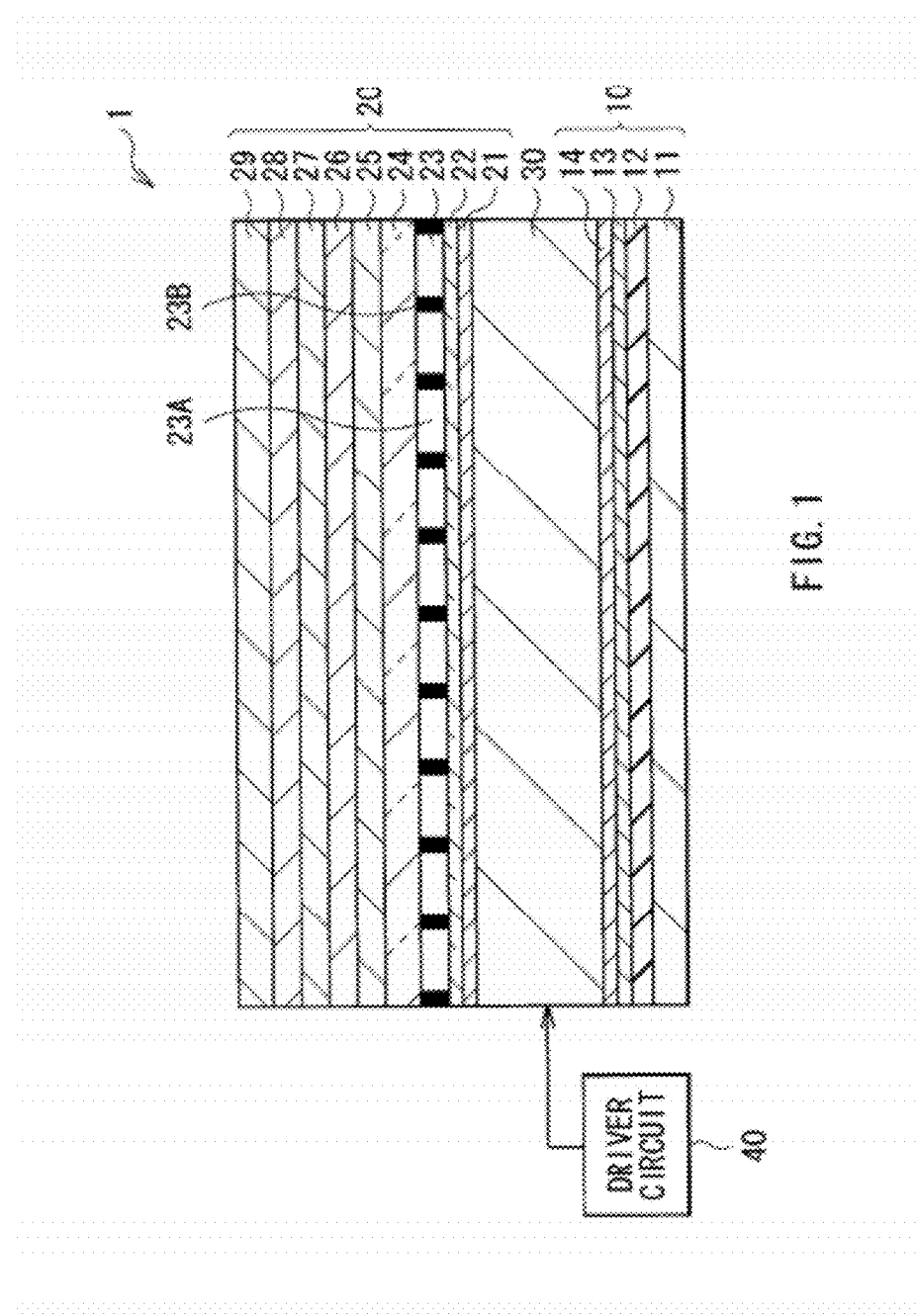

DISPLAY DEVICE AND ELECTRONIC APPARATUS

BACKGROUND

The present technology relates to a display device of a reflection type or of a semi-transmission type that includes a reflective section and a transmissive section. Furthermore, the present technology relates to an electronic apparatus provided with the above display device.

In recent years, display devices for mobile appliances, such as portable phones and electronic papers, have been increasingly in demand. Among display devices for mobile appliances, backlight-free reflective display devices are attracting attention due to their lightweight, compact body (for reference, see Japanese Patent Registration No. 2771392).

SUMMARY

Display devices for mobile appliances are expected to further decrease their power consumption. It is thus conceivable that a display device be driven at a low rate, such as less than 60 Hz.

However, when driven at as low as less than 60 Hz, the display device is likely to cause flickers, and therefore, may become insufficient for practical use.

There is a need for a display device that achieves low power consumption while suppressing the occurrence of flickers, and an electronic apparatus provided with this display device.

A display device according to an embodiment of the present technology includes: a liquid crystal display panel; and a driver circuit driving the liquid crystal display panel. The liquid crystal display panel includes a liquid crystal layer, a plurality of pixel electrodes, a phase difference layer, and a polarizing plate. The pixel electrodes are provided in a region facing the liquid crystal layer and apply a voltage to the liquid crystal layer. The phase difference layer and the polarizing plate are provided on a side, relative to the liquid crystal layer, which ambient light enters. Each of the pixel electrodes includes a plurality of partial electrodes, and the driver circuit selects one or more partial electrodes from the partial electrodes to which a constant voltage is to be applied in accordance with an image signal. The constant voltage causes the liquid crystal display panel to be in a white state. The driver circuit performs gray-scale display by modulating lighting area of each pixel at a frame rate of less than 60 Hz.

An electronic apparatus according to an embodiment of the present technology is provided with a display device. The display device includes: a liquid crystal display panel; and a driver circuit driving the liquid crystal display panel. The liquid crystal display panel includes a liquid crystal layer, a plurality of pixel electrodes, a phase difference layer, and a polarizing plate. The pixel electrodes are provided in a region facing the liquid crystal layer and apply a voltage to the liquid crystal layer. The phase difference layer and the polarizing plate are provided on a side, relative to the liquid crystal layer, which ambient light enters. Each of the pixel electrodes includes a plurality of partial electrodes, and the driver circuit selects one or more partial electrodes from the partial electrodes to which a constant voltage is to be applied in accordance with an image signal. The constant voltage causes the liquid crystal display panel to be in a white state. The driver circuit performs gray-scale display by modulating lighting area of each pixel at a frame rate of less than 60 Hz.

The display device and the electronic apparatus according to the embodiments of the present technology display an image by employing area coverage modulation and in a normally black mode. The area coverage modulation functions as generating a gray-scale image by using binary values of black and white without using halftone values. The normally black mode functions as providing stable luminance without being affected by a difference among the applied voltages for the white state. Hence, for example, when the constant voltage is applied to the common electrode during the frame inversion driving, the 1H inversion driving, the 1V inversion driving, the dot inversion driving, or some other driving, stable luminance is provided even if the respective voltages applied to the liquid crystal layer for pixels differ from one another. Also, because of this stable luminance, it is possible to suppress the occurrence of flickers, even at a low drive frequency.

Since displaying an image by employing the area coverage modulation and in the normally black mode, both the display device and the electronic apparatus according to the embodiments of the present technology suppress the occurrence of flickers, even at a low frame rate. Thus, the display device and the electronic apparatus according to the embodiments of the present technology have achieved low power consumption while suppressing the occurrence of flickers.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIG. 1 is a view depicting an example of a vertically cross-sectional structure of a display device according to an embodiment of the present technology.

DETAILED DESCRIPTION

Figure 2A:
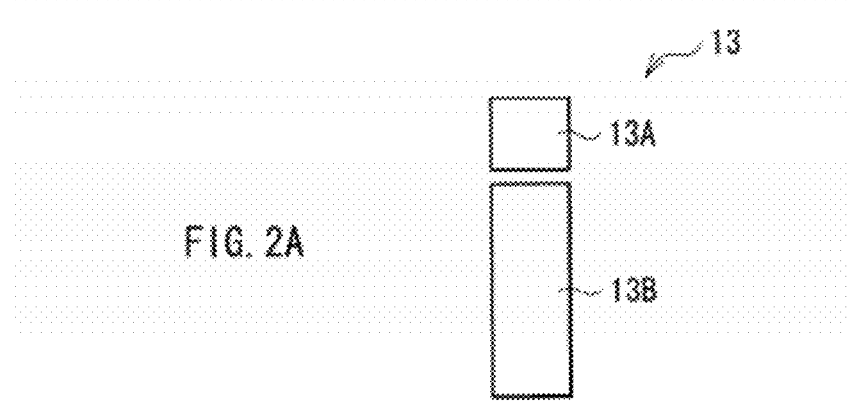
FIGS. 2A, 2B, and 2C are views depicting respective examples of a lateral structure of each pixel electrode in the display device shown in FIG. 1.

Hereinafter, an embodiment of the present technology will be described in detail with reference to the accompanying drawings. This description will be given in the following order.
1. Embodiment (Display Device)
  An example is given in which a liquid crystal display panel is driven by employing the area coverage modulation, in the normally black mode, at a low frame rate, and at a constant COM voltage potential.
2. Application Example (Electronic Apparatus)
  An example is given in which the display device according to the above embodiment is applied to an electronic apparatus.

1. Embodiment (Structure)
FIG. 1 illustrates an example of a vertically cross-sectional structure of a display device 1 according to an embodiment of the present technology. FIG. 1 schematically illustrates the structure, and therefore, its dimensions and shape may not be identical to those of the real one. Note that the display device 1 corresponds to a concrete example of a "display device" according to an embodiment of the present technology. The display device 1 is a reflective or semi-transmissive display device, and includes, for example, a lower substrate 10, an upper substrate 20, a liquid crystal layer 30 sandwiched between the lower substrate 10 and the upper substrate 20, and a driver circuit 40 that drives the lower substrate 10, as shown in FIG. 1. Note that the lower substrate 10, the upper substrate 20, and the liquid crystal layer 30 constitute a liquid crystal display panel, which corresponds to a concrete example of a "liquid crystal display panel" according to an embodiment of the present technology. In addition, the driver circuit 40 and the liquid crystal layer 30 correspond to a concrete example of a "driver circuit" and a "liquid crystal layer" according to an embodiment of the present technology, respectively.

In the display device 1, an upper surface of the upper substrate 20 (for example, a "polarizing plate 29" (described hereinafter)) constitutes an image display surface, and a light source such as a backlight is not disposed on the back surface of the lower substrate 10. Thus, the display device 1 serves as a reflective display device that displays an image by reflecting light incident from the image display surface.

(Liquid Crystal Layer 30)
The liquid crystal layer 30 contains, for example, nematic liquid crystal. This liquid crystal layer 30 is driven in accordance with an image signal. When a voltage according to the image signal is applied to the liquid crystal layer 30, the liquid crystal layer 30 fulfills a modulation function by allowing light that has entered the liquid crystal layer 30 to pass therethrough or to be blocked for each pixel.

(Lower Substrate 10)
The lower substrate 10 includes, for example, a drive substrate 11 having thin film transistors (TFTs), etc. formed therein, an insulating layer 12 covering the TFTs, etc., a reflective electrode layer 13 electrically connected to the TFTs, etc., and an orientation film 14 formed on an upper surface of the reflective electrode layer 13, as shown in FIG. 1. Note that the reflective electrode layer 13 corresponds to a concrete example of "a plurality of pixel electrodes" according to an embodiment of the present technology.

The drive substrate 11 contains a pixel circuit including the TFTs and capacitative elements formed on a transparent substrate, such as a glass substrate. This transparent substrate may be made of not only a glass substrate, but also any other material, such as translucent resin, quartz or silicon substrate.

The reflective electrode layer 13 drives the liquid crystal layer 30 in collaboration with a transparent electrode layer 22 (described hereinafter) in the upper substrate 20, and includes, for example, multiple pixel electrodes arranged on a plane in a two-dimensional form. When the driver circuit applies a voltage between the pixel electrodes and the transparent electrode layer 22, an electric field is generated between the pixel electrodes and the transparent electrode layer 22 in accordance with a potential difference therebetween, and the liquid crystal layer 30 is driven in accordance with the magnitude of the electric field. In the display device 1, a portion corresponding to a region where one pixel electrode and the transparent electrode 22 are arranged opposite each other constitutes a basic unit that partially drives the liquid crystal layer 30 in accordance with a voltage applied between the pixel electrode and the transparent electrode layer 22. This basic unit corresponds to a "pixel". In addition, the reflective electrode layer 13 serves as a reflective layer that reflects ambient light incident from the liquid crystal layer 30 toward the liquid crystal layer 30. The reflective electrode layer 13 may be made of a conductive material that reflects visible light, such as silver or any other metal material. Preferably, a surface of the reflective electrode layer 13 is subjected to a mirror finish.

Figure 2B:
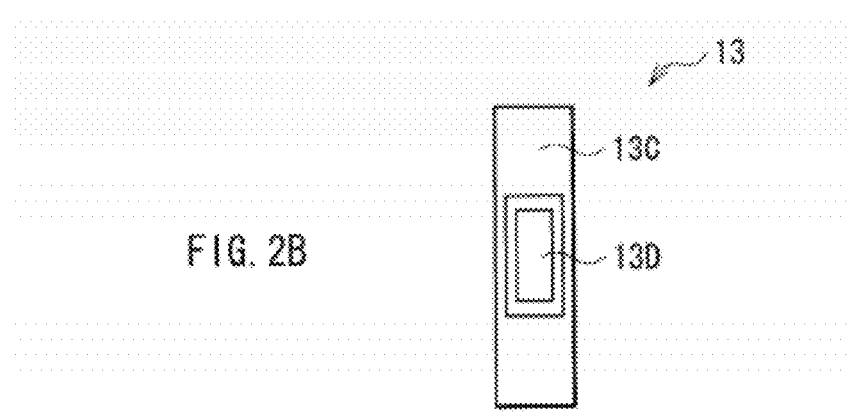
Figure 2C:
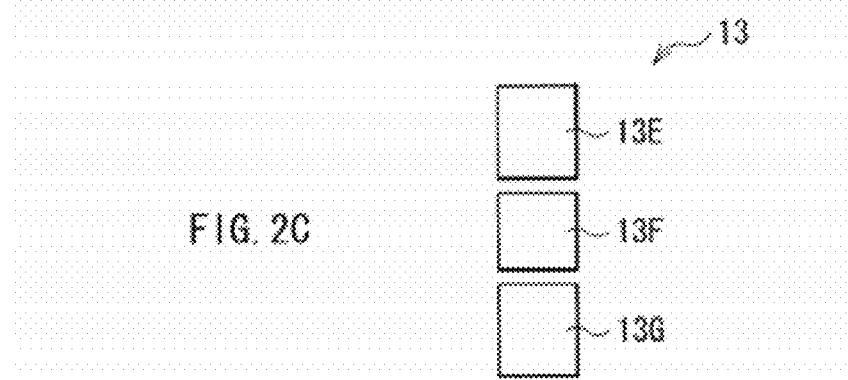

When the reflective electrode layer 13 includes the multiple pixel electrodes, as described above, each of the pixel electrodes has multiple partial electrodes. As shown in FIG. 2A, for example, each pixel electrode may be constituted by arranging, in a side-by-side fashion, a partial electrode 13A having a relatively small area, and a partial electrode 13B having a relatively large area. Alternatively, as shown in FIG. 2B, for example, each pixel electrode may be constituted by a partial electrode 13C having an opening, and a partial electrode 13D disposed in the opening of the partial electrode 13C. Alternatively, as shown in FIG. 2C, for example, each pixel electrode may be constituted by arranging, in a line, partial electrodes 13E, 13F and 13G having the same area.

The orientation film 14 serves a purpose of orienting the liquid crystal molecules in the liquid crystal layer 30 in a predetermined direction. This orientation film 14 is disposed in direct contact with the liquid crystal layer 30. The orientation film 14 may be made of a polymeric material, such as polyimide, and be formed, for example, by subjecting applied polyimide or the like to a rubbing treatment.

(Upper Substrate 20)
The upper substrate 20 includes, for example, an orientation film 21, the transparent electrode layer 22, a color filter (CF) layer 23, and a transparent substrate 24 in this order from the side closer to the liquid crystal layer 30, as shown in FIG. 1.

The orientation film 21 serves a purpose of orienting the liquid crystal molecules in the liquid crystal layer 30 in a predetermined direction. This orientation film 14 is disposed in direct contact with the liquid crystal layer 30. The orientation film 21 may be made of a polymeric material, such as polyimide, and be formed, for example, by subjecting applied polyimide or the like to a rubbing treatment.

The transparent electrode layer 22 is disposed opposite the pixel electrodes, and includes, for example, a sheet-like electrode formed throughout the plane. This transparent electrode layer 22 is disposed opposite the pixel electrodes, in order to serve as a common electrode for the pixels. The transparent electrode layer 22 may be made of a conductive material that is translucent for ambient light, such as indium tin oxide (ITO).

The CF layer 23 includes color filters 23A and light shielding films 23B. The color filters 23A are arranged in regions facing the pixel electrodes, whereas the light shielding films 23B are arranged in regions that do not face the pixel electrodes. The color filters 23A include color filters that separate light that has passed through the liquid crystal layer 30 into, for example, three primary color components of red, green and blue components, and are arranged corresponding to the pixels. Each light shielding film 23B has a function of, for example, absorbing visible light, and the light shielding films 23B are arranged between the adjacent pixels. The transparent substrate 24 may be made of a transparent substrate for ambient light, such as a glass substrate.

Furthermore, the upper substrate 20 includes, for example, a light scattering layer 25, a light scattering layer 26, a ¼λ plate 27, a ½λ plate 28, and the polarizing plate 29 on an upper surface of the transparent substrate 24 in this order from the side closer to the liquid crystal layer 30, as shown in FIG. 1. Each of the light scattering layer 25, the light scattering layer 26, the ¼λ plate 27, the ½λ plate 28, and the polarizing plate 29 is joined to the adjacent layers or layer through, for example, adhesive or bonding layers. Note that a combination of the ¼λ plate 27 and the ½λ plate 28 corresponds to a concrete example of a "phase difference layer" according to an embodiment of the present technology. In addition, the polarizing plate 29 corresponds to a concrete example of a "polarizing plate" according to an embodiment of the present technology.

Each of the light scattering layers 25 and 26 serves as a front scattering layer that scatters light more greatly in the front direction than in the rear direction, as well as an anisotropic scattering layer that scatters light incident in a specific direction. Each of the light scattering layers 25 and 26 allows light incident from the polarizing plate 29 in a specific direction with respect to the upper substrate 20, to pass therethrough while hardly scattering the light, whereas greatly scattering light reflected by and returned from the reflective electrode layer 13.

Figure 3A:
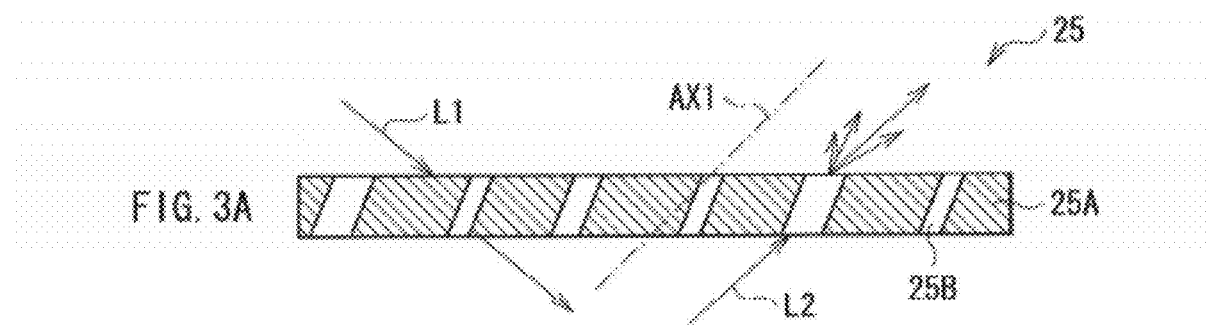
FIGS. 3A and 3B are views depicting an example of a vertically cross-sectional structure of a light scattering layer shown in FIG. 1.
Figure 3B:
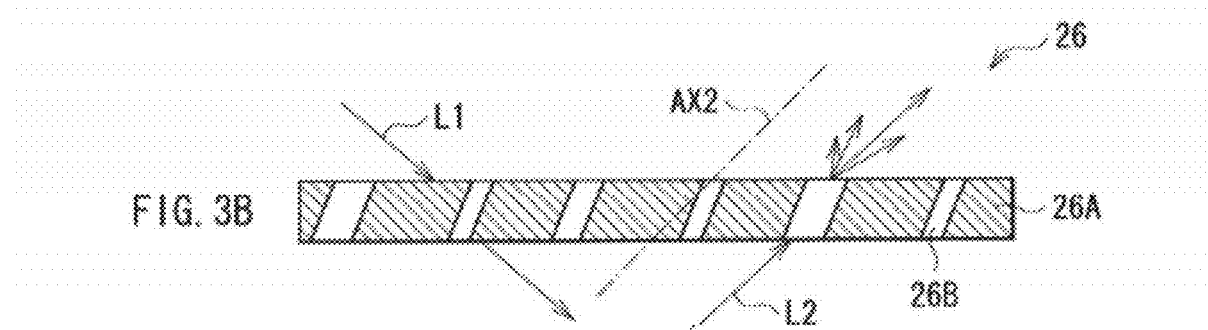

As shown in FIG. 3A, for example, the light scattering layer 25 allows the external light L1 to pass therethrough, when external light L1 enters the light scattering layer 25 in a specific direction with respect to the upper substrate 20. Meanwhile, the light scattering layer 25 scatters light L2, which corresponds to the light L1 having been reflected by the reflective electrode layer 13, within a predetermined area having a scattering central axis AX1 as a center. As shown in FIG. 3B, for example, the light scattering layer 26 allows the external light L1 to pass therethrough, when external light L1 enters the light scattering layer 26 in a specific direction with respect to the upper substrate 20. Meanwhile, the light scattering layer 26 scatters light L2, which corresponds to the light L1 having been reflected by the reflective electrode layer 13, within a predetermined area having a scattering central axis AX2 as a center. In this case, the external light L1 is parallel light that has entered the polarizing plate 29 of the upper substrate 20. Note that this external light L1 may be either unpolarized or polarized light.

The light scattering layer 25 includes two regions (or first regions 25A and second regions 25B) which have different refractive indices, for example, as shown in FIG. 3A. Likewise, the light scattering layer 26 includes two regions (or first regions 26A and second regions 26B) that have different refractive indices, for example, as shown in FIG. 3B. Note that FIGS. 3A and 3B illustrate an example of a vertically cross-sectional structure of the light scattering layers 25 and 26, respectively. Each of the light scattering layers 25 and 26 may employ either a louver or columnar structure (not shown).

In the light scattering layer 25, the first regions 25A and the second regions 25B are formed, for example, so as to extend in the thickness direction while inclining at a predetermined angle. Likewise, in the light scattering layer 26, the first regions 26A and the second regions 26B are formed, for example, so as to extend in the thickness direction while inclining at a predetermined angle. Each of the light scattering layers 25 and 26 may be made, for example, by irradiating a resin sheet, which is a mixture of more than two light curable monomers or oligomers having different refractive indices, with ultraviolet rays in an oblique direction. Alternatively, each of the light scattering layers 25 and 26 may employ any structure different from the above, and be made by any method different from the above. In addition, the respective structures of the light scattering layers 25 and 26 may be either the same as or different from each other.

Preferably, the respective scattering central axes AX1 and AX2 of the light scattering layers 25 and 26 are oriented in the same direction. For example, preferably, both of the scattering central axes AX1 and AX2 are oriented in a direction aligned with an orientation of a main viewing angle. However, the scattering central axes AX1 and AX2 may be oriented in different directions. For example, one of the scattering central axes AX1 and AX2 may be aligned with the orientation of the main viewing angle, whereas the other may not. Alternatively, for example, the respective scattering central axes AX1 and AX2 may be oriented in different directions, which are not aligned with the orientation of the main viewing angle. In any case, when the light scattering layers 25 and 26 are used, the angles of the scattering central axes AX1 and AX2 may be set to any angles, as long as the luminance (or the reflection ratio) has the greatest value at the main viewing angle, due to the effect of the light scattering layers 25 and 26.

In this embodiment, the "main viewing angle" corresponds to a viewing angle at which a user of the display device 1 forms with the display device surface upon operation. For example, if the display device surface has a rectangular shape, the main viewing angle corresponds to an angle formed such that a sight line of a user is orthogonal to the edge of the display device surface which is closest to the user.

Figure 4:
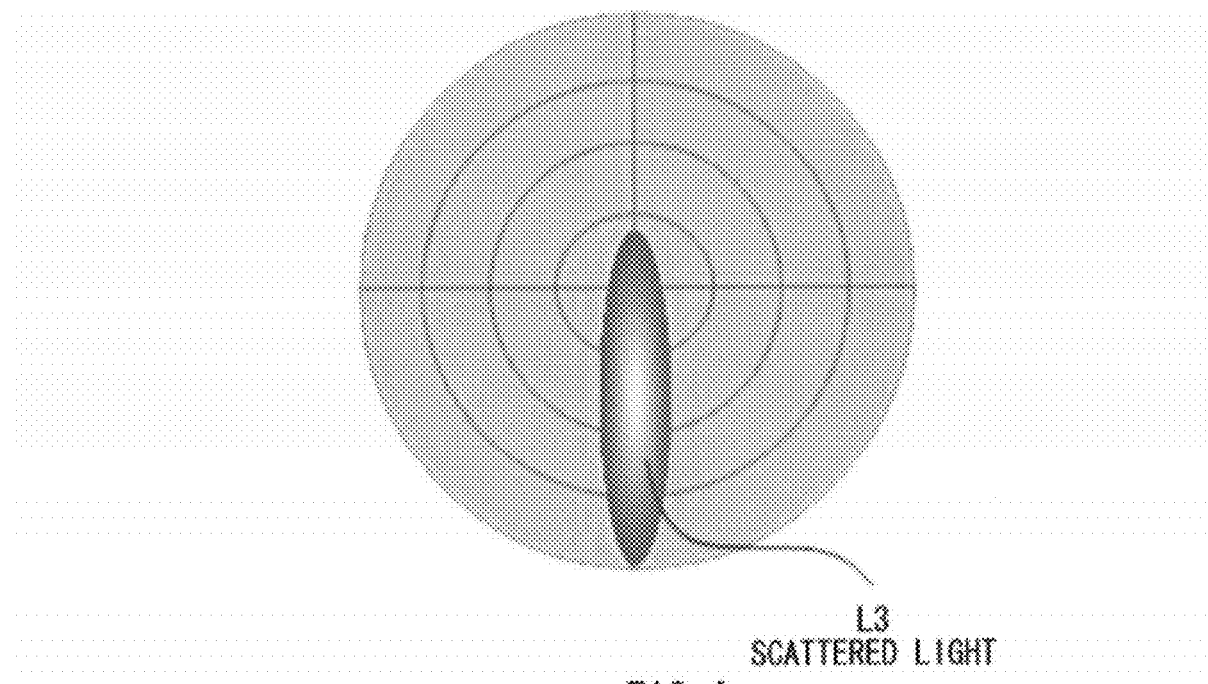
FIG. 4 is a view depicting an example of a property of a main viewing angle in the light scattering layer shown in FIG. 1

Referring to FIG. 4, for example, the scattered light generated by the light scattering layers 25 and 26 shows a luminance distribution of a band shape over a polar angle range of 0° to 90° in the orientation of the main viewing angle, when the vertical axis represents the main viewing angle. Note that FIG. 4 is a graph depicting an example of a viewing angle property of the light scattering layers 25 and 26. In FIG. 4, a region indicated by a "scattered light L3" corresponds to the luminance distribution of the scattered light generated by the light scattering layers 25 and 26.

The ¼λ plate 27 may be made of, for example, a monoaxially-oriented resin film. The retardation of the ¼λ plate 27 may be, for example, 0.14 μm, which is equivalent to one quarter of a wavelength of a green light component having the highest luminosity factor among visible light components. Accordingly, the ¼λ plate 27 has a function of converting linearly polarized light incident from the polarizing plate 29 to circularly polarized light. The ½λ plate 28 may be made of, for example, a monoaxially-oriented resin film. The retardation of the ½λ plate 28 may be, for example, 0.27 μm, which is equivalent to one half of a wavelength of a green light component having the highest luminosity factor among visible light components. In this embodiment, a combination of the ¼λ plate 27 and the ½λ plate 28 has a function of converting linearly polarized light incident from the polarizing plate 29 to circularly polarized light. This combination serves as a (wide bandwidth) circularly polarizing plate for light of a wide wavelength range. The polarizing plate 29 has a function of absorbing a predetermined linearly polarized component, and allowing other polarized components to pass therethrough. Accordingly, the polarizing plate 29 has a function of converting external light incident from outside into linearly polarized light.

Figure 5A:
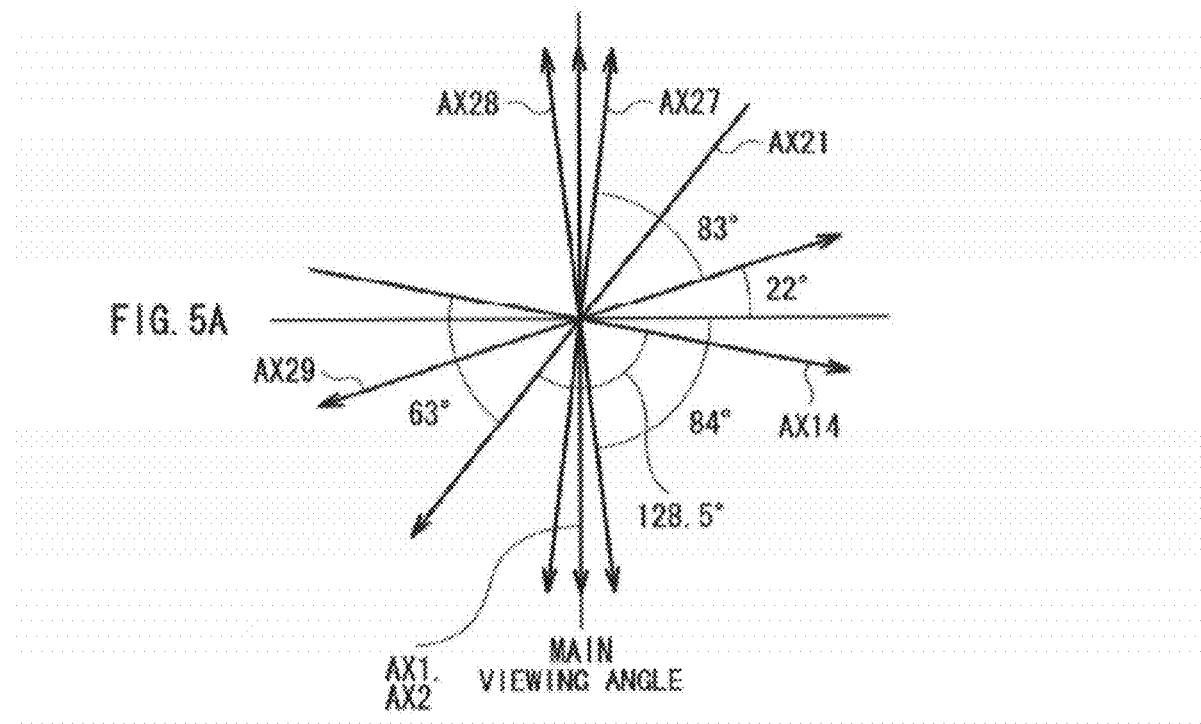
FIG. 5A is a view depicting an example of a relationship among a transmission axis, an optical axis, a scattering central axis, and a rubbing direction of components, when the display device is viewed from an image display surface.
Figure 5B:
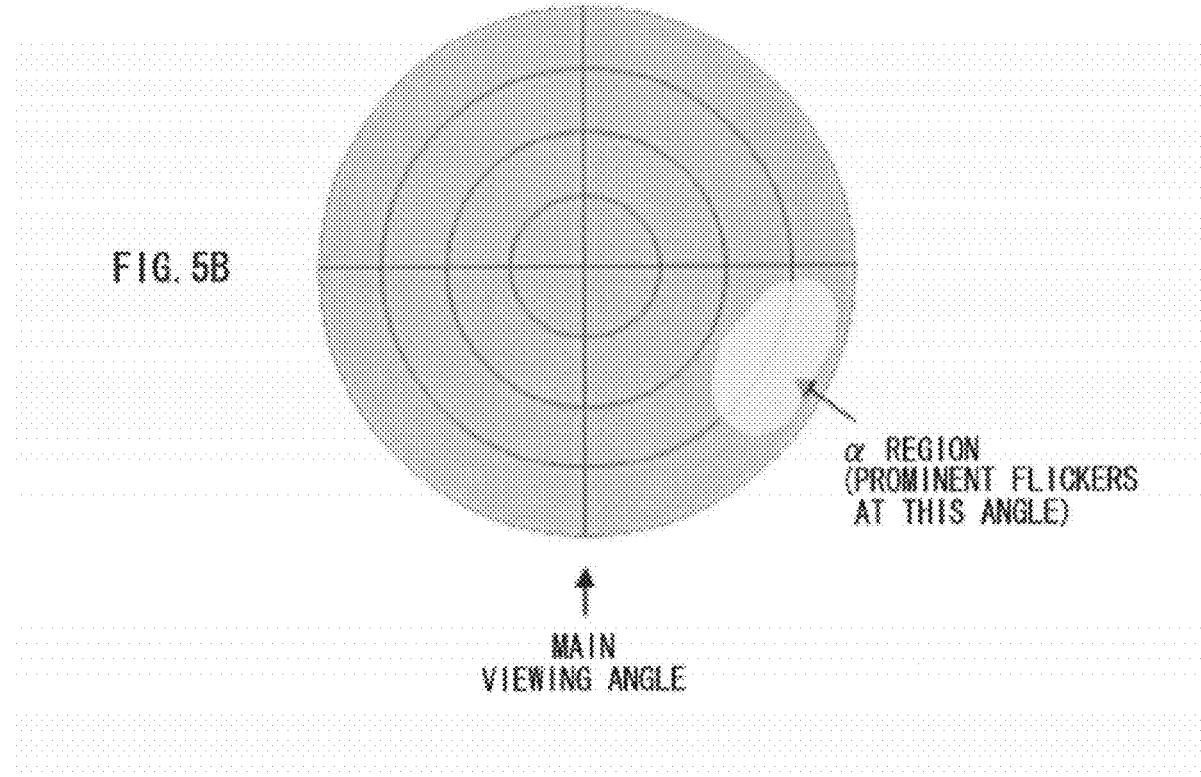
FIG. 5B is a view depicting an example of an orientation of the display device in which flickers are prominent, when the display device has the structure shown in FIG. 5A.

In the liquid crystal display panel including the lower substrate 10, the upper substrate 20, and the liquid crystal layer 30, an orientation in which flickers are the most prominent is set to differ from that of the main viewing angle, when the light scattering layers 25 and 26 are not provided. For example, in this liquid crystal display panel, an orientation in which flickers are the most prominent may be set to differ from the main viewing angle by several tens of degrees, when the light scattering layers 25 and 26 are not provided. Specifically, when a user views the image display surface of the display device 1, a transmission axis AX29 of the polarizing plate 29, an optical axis AX28 of the ½λ plate 28, an optical axis AX27 of the ¼λ plate 27, a scattering central axis AX2 of the light scattering layer 26, a scattering central axis AX1 of the light scattering layer 25, a rubbing direction AX21 of the orientation film 21, and a rubbing direction AX14 of the orientation film 14 may be set to those shown in FIG. 5A. In this case, as shown in FIG. 5B, flickers are not prominent in the orientation of the main viewing angle, whereas they are prominent within a region a located at an angle shifted from the main viewing angle.

(Pixel)

Figure 6:
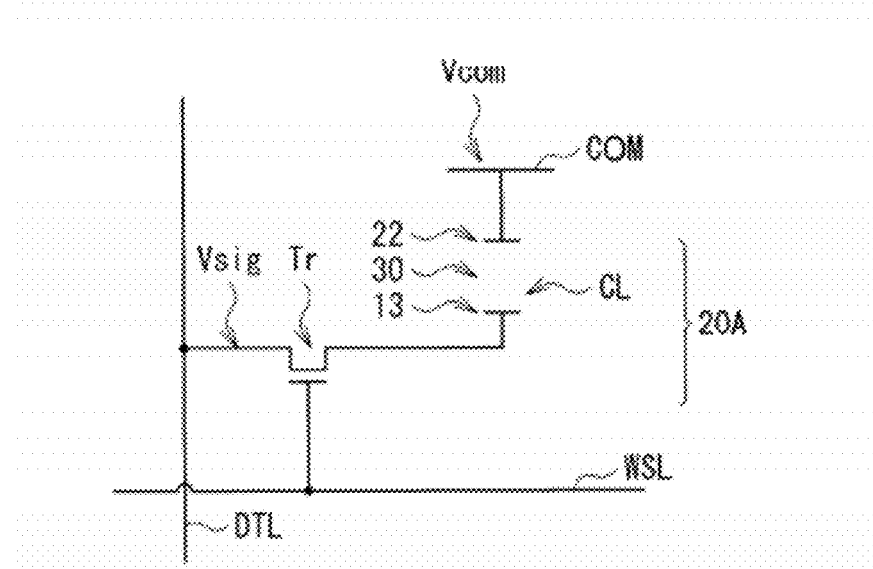
FIG. 6 is a circuit diagram depicting an example of a structure of a pixel electrode in the display device shown in FIG. 1.

FIG. 6 illustrates an example of a circuit configuration of the lower substrate 10. The lower substrate 10 includes multiple rows of scan lines WSL and multiple columns of signal lines DTL. In addition, the lower substrate 10 includes multiple pixels 20A corresponding to the pixel electrodes. The pixels 20A are arranged at the corresponding intersections of the scan lines WSL and the signal lines DTL, for example, as shown FIG. 6. Furthermore, the lower substrate 10 includes multiple common connection lines COM having a band shape which are provided commonly, for example, for each pixel row.

Each pixel 20A includes, for example, a transistor Tr and a liquid crystal element CL, as shown in FIG. 6. The transistor Tr may be, for example, a field-effect thin-film transistor (TFT), and has a gate that controls a channel, and a source and drain which are connected to respective ends of the channel. The transistor Tr may have either P or N type. The liquid crystal element CL includes, for example, the liquid crystal layer 30, the reflective electrode layer 13 provided on one side of the liquid crystal layer 30, and the transparent electrode layer 22 provided on the other side of the liquid crystal layer 30.

The transparent electrode layer 22 is connected to the common connection lines COM, and the reflective electrode layer 13 is connected to the sources or drains of the transistors Tr. The gate of each transistor Tr is connected to the scan line WSL, and one of the source and drain thereof which is not connected to the reflective electrode layer 13 is connected to the signal line DTL. In this embodiment, for example, individual gates of transistors Tr for pixels 20A arranged on one lateral line are connected commonly to one scan line WSL. In other words, pixels 20A connected to one scan line WSL are arranged in a line along one scan line WSL.

(Drive Circuit 40)

Next, the driver circuit 40 will be described below. Although not shown in the drawings, the driver circuit 40 includes, for example, an image signal processing circuit, a timing generation circuit, a signal line driver circuit, a scan line driver circuit, and a common connection line driver circuit.

The image signal processing circuit corrects a digital image signal received from an external source, and converts the corrected image signal into an analog image signal, then outputting this signal to the signal line driver circuit. The timing generation circuit controls the signal line driver circuit and the scan line driver circuit to operate in relation to each other. This timing generation circuit outputs a control signal to the signal line driver circuit and the scan line driver circuit, for example, in accordance with (or in synchronization with) a synchronizing signal received from an external source.

Figure 7:
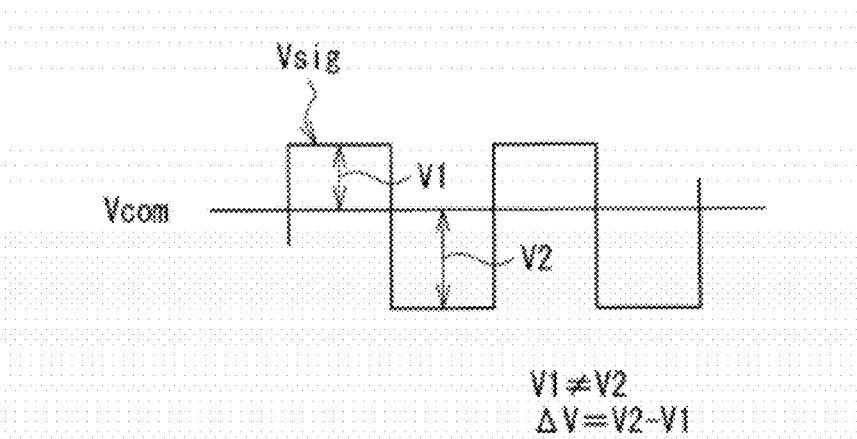
FIG. 7 is a waveform chart depicting an example of a drive waveform in the display device shown in FIG. 1.

The signal line driver circuit applies the analog image signal received from the image signal processing circuit to the signal lines DTL, thereby writing the analog image signal into pixels 20A that are targeted for selection. The signal line driver circuit is allowed to output a signal voltage Vsig corresponding to the image signal, for example, as shown in FIG. 7. Specifically, this signal line driver circuit is allowed to perform frame inversion driving by applying the signal voltage Vsig, the polarity of which is inverted for each frame period in relation to a reference voltage, to the signal lines DTL and by writing the signal voltage Vsig into pixels 20A that are targeted for selection, for example, as shown in FIG. 7. The frame inversion driving is used to decrease the degree of the deterioration of the liquid crystal elements CL, and may be employed as appropriate. Furthermore, the signal line driver circuit is also allowed to perform 1H inversion driving by applying the signal voltage Vsig, the polarity of which is inverted for each 1H period in relation to the reference voltage, to the signal lines DTL and by writing voltages according to the signal voltages Vsig into pixels 20A that are targeted for selection, for example, as shown in FIG. 7. The 1H inversion driving is used to suppress the occurrence of flickers for each frame in response to the inversion of the polarity of a voltage applied to the liquid crystal elements CL, and may be employed as appropriate. In this case, the reference voltage may be, for example, 0 V.

The scan line driver circuit applies selection pulses to the scan lines WSL in accordance with (or in synchronization with) the input of the above control signal, thereby selecting multiple pixel 20A as a desired unit. The unit to select the pixels 20A, such as one line or two adjacent lines, may be selected as appropriate. In addition, the lines may be selected sequentially or randomly. For example, the scan line driver circuit may output a voltage Von to be applied for turning on the transistor Tr, and a voltage Voff to be applied for turning off the transistor Tr. In this case, the voltage Von may be a value (constant value) that is equal to/higher than a voltage level at which the transistor Tr turns on, whereas the voltage Voff may be a value (constant value) that is lower than the voltage level at which the transistor Tr turns on.

The common connection line driver circuit applies a constant voltage Vcom to the common connection lines COM for each frame period, for example, as shown in FIG. 7. In more detail, the common connection line driver circuit keeps applying the constant voltage to the common connection lines COM without driving the common connection lines COM during the frame inversion driving, the 1H inversion driving, or some other driving. Therefore, as shown in FIG. 7, when the signal voltage Vsig is applied to the signal lines DTL while being inverted for each predetermined period, a voltage V1 applied to the liquid crystal elements CL before the inverse of the signal voltage Vsig is different from a voltage V2 applied to the liquid crystal elements CL after the inverse of the signal voltage Vsig.

The driver circuit 40 selects one or more from the partial electrodes contained in each pixel electrode to which a constant voltage, that causes the liquid crystal panel to be in a white state, is to be applied, in accordance with the image signal. For example, if each pixel electrode has the structure shown in FIG. 2A, the driver circuit 40 selects the partial electrodes 13A upon low gray-scale display, the partial electrodes 13B upon middle gray-scale display, and both the partial electrodes 13A and 13B upon high gray-scale display. Alternatively, if each pixel electrode has the structure shown in FIG. 2B, the driver circuit 40 selects the partial electrode 13D upon low gray-scale display, the partial electrode 13C upon middle gray-scale display, and both the partial electrodes 13C and 13D upon high gray-scale display. Alternatively, if each pixel electrode has the structure shown in FIG. 2C, the driver circuit 40 selects the partial electrodes 13E upon low gray-scale display, both the partial electrodes 13E and 13F upon middle gray-scale display, and all the partial electrodes 13E, 13F, and 13G upon high gray-scale display.

As described above, the driver circuit 40 selects one or more from the partial electrodes contained in each pixel electrode to which a constant voltage that causes the liquid crystal display panel to be in a white state is to be applied, in accordance with the image signal. Moreover, by applying, to the selected partial electrodes, the constant voltage that causes the liquid crystal display panel to be in a white state, the driver circuit 40 modulates the lighting area on each pixel 20A. In addition, the driver circuit 40 also negatively selects all the partial electrodes contained in each pixel electrode in accordance with the image signal, and, then applies, to the negatively selected partial electrodes, a constant voltage that causes the liquid crystal display panel to be in a black state, thereby modulating the lighting area on each pixel 20A. Note that the constant voltage which causes the image display surface to be in a white state is higher than that which causes the image display surface to be in a black state. The constant voltage that causes the liquid crystal display panel to be in a black state may be, for example, 0 V or approximately 0 V. Thus, the liquid crystal display panel that includes the lower substrate 10, the upper substrate 20, and the liquid crystal layer 30 operates in a normally black display mode.

While the liquid crystal display panel is displaying an image, the driver circuit 40 sets a frame rate to less than 60 Hz. For example, during displaying of an image, the driver circuit 40 may set a frame rate to a range from 0.1 Hz inclusive to less than 60 Hz.

[Functional Effect]

Next, a description will be given below of a functional effect of the display device 1 according to this embodiment.

For example, when ambient light enters the liquid crystal display panel according to this embodiment in a specific direction, the polarizing plate 29 converts the incident light into linearly polarized light. Following this, the ½λ plate 28 and the ¼λ plate 27 convert the linearly polarized light into circularly polarized light, and then, the circularly polarized light enters the liquid crystal layer 30. The liquid crystal layer 30 modulates the incident light in accordance with an image signal, and then, the reflective electrode layer 13 reflects the modulated light. The ¼λ plate 27 and the ½λ plate 28 convert the light reflected by the reflective electrode layer 13 into linearly polarized light, and the polarizing plate 29 allows this light to pass therethrough. Finally, the light is output from the liquid crystal display panel as an optical image.

Figure 8:
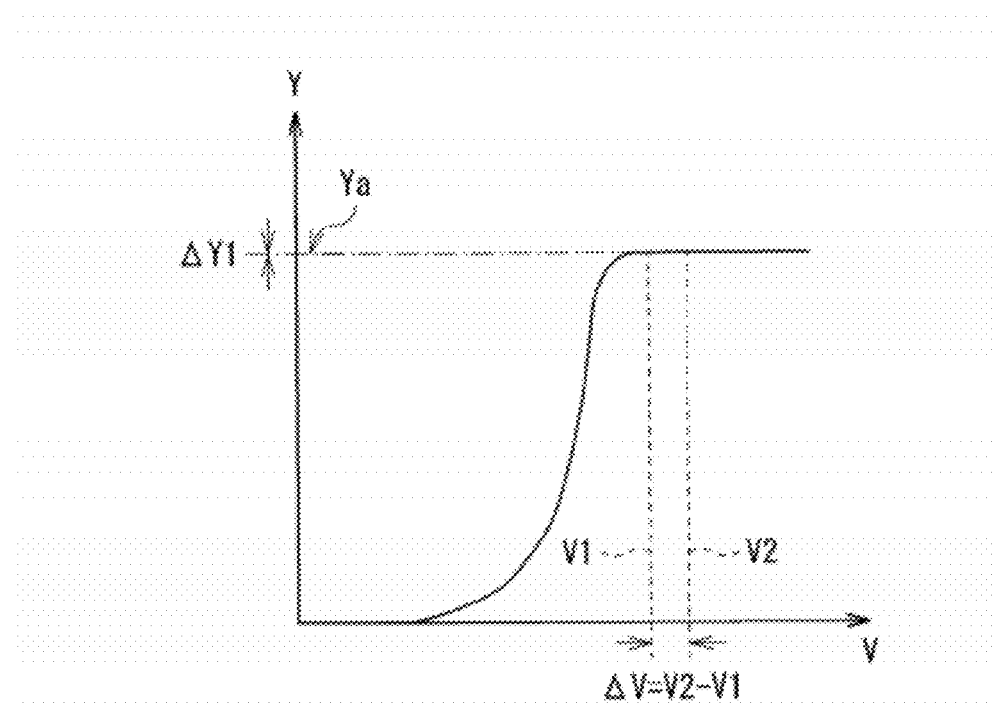
FIG. 8 is a view depicting an example of a relationship between an applied voltage and a reflectance ratio in the display device operating in a normally black display mode.
Figure 9:
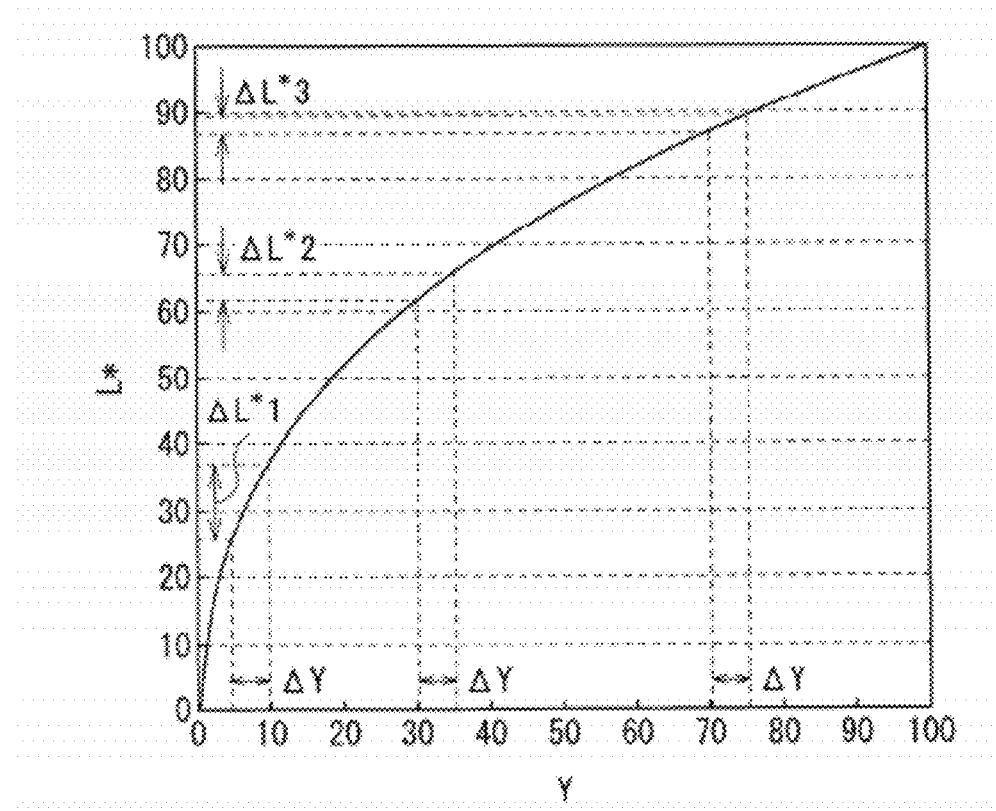
FIG. 9 is a view depicting an example of a relationship between a reflectance ratio and luminance.
Figure 10:
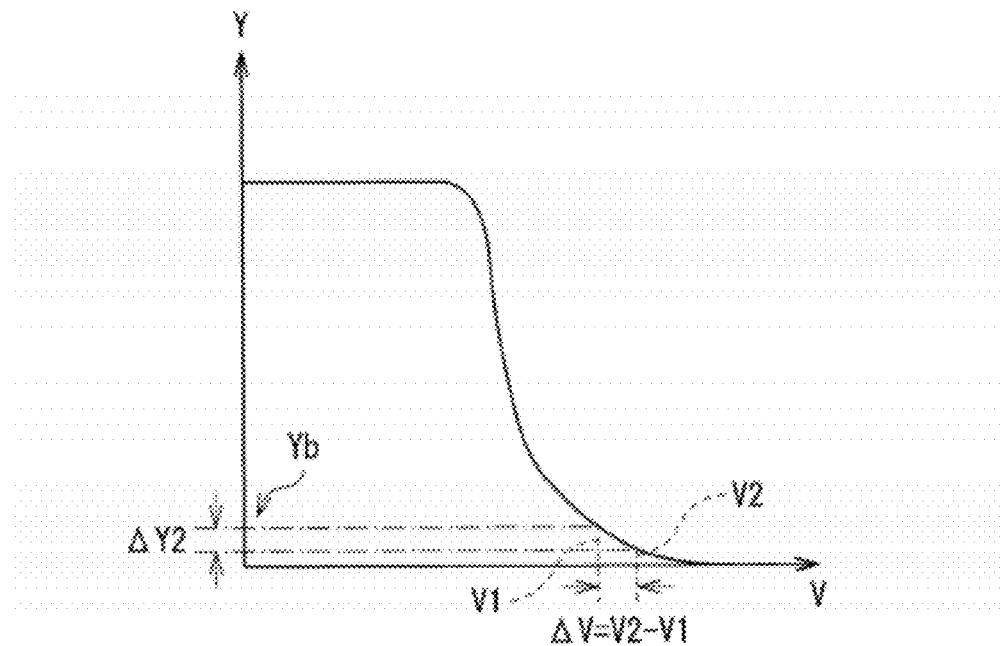
FIG. 10 is a view depicting an example of a relationship between an applied voltage and a reflectance ratio in the display device operating in a normally white display mode.

FIG. 8 schematically shows a relationship between an applied voltage V and a reflectance ratio Y in the normally black display mode. FIG. 9 schematically shows a relationship between a reflectance ratio Y and a luminance L*. FIG. 10 schematically shows a relationship between an applied voltage V and a reflectance ratio Y in the normally white display mode as a reference example.

As described above, the liquid crystal display panel according to this embodiment operates in the normally black display mode. Accordingly, to give an example, the driver circuit 40 applies a potential difference V1 to a liquid crystal element CL, as a constant voltage that causes the liquid crystal display panel to be in a white state. In this case, the liquid crystal element CL to which the potential difference V1 is applied shows a predetermined reflectance ratio Ya. To give a next example, the driver circuit 40 applies a potential difference V2 to the liquid crystal element CL, as a constant voltage that causes the liquid crystal display panel to be in a white state. This potential difference V2 (=V1+ΔV) is higher than the potential difference V1 by a voltage difference ΔV, that is assumed to be or equivalent to the difference among voltages on the common connection lines COM. In this case, a reflectance ratio of the liquid crystal element CL to which the potential difference V2 is applied is substantially equal to the above-described reflectance ratio, or a value Ya+ΔY1 (ΔY1 is substantially zero). As described above, when the liquid crystal display panel operates in the normally black display mode, even if voltages on the common connection lines COM are different from one another, the difference ΔY among the reflectance ratios of the liquid crystal elements CL becomes substantially zero. Thus, in this embodiment, it is possible to make the difference ΔY among the reflectance ratios substantially zero without changing the voltages on the common connection lines COM. Accordingly, the luminance of the liquid crystal display panel in a white state is substantially uniform, independently of the difference among the voltages on the common connection lines COM. This enables the occurrence of flickers to be prevented.

However, the difference ΔY among the reflectance ratios may be too large to be approximated to zero in a certain optical design. Even in this case, for example, as shown in FIG. 9, with regard to each of reflectance ratio differences ΔY having the same predetermined value that is independent of the reflectance ratio Y, as the reflectance ratio Y (or the luminance) increases, the difference ΔL of the luminances decreases. Accordingly, as long as the liquid crystal display panel operates in the normally black display mode, even if the difference ΔY among the reflectance ratios is too large to be approximated to zero, the luminance of the white image is not greatly nonuniform. This makes it possible to prevent the occurrence of flickers, independently of the difference among the voltages on the common connection lines COM.

On the other hand, if the liquid crystal display panel operates in the normally white display mode, the above-described functional effect does not apply to the liquid crystal display panel, as shown in FIG. 10. Specifically, for example, the driver circuit applies a potential difference V1 to a liquid crystal element in the liquid crystal display panel of the normally white type, as a constant voltage that causes the liquid crystal display panel to be in a black state. Then, the liquid crystal element to which the potential difference V1 is applied shows a predetermined reflectance ratio Yb. Following this, the driver circuit applies a potential difference V2 to the liquid crystal element, as a constant voltage that causes the liquid crystal display panel to be in a black state. This potential difference V2 (=V1+$\Delta$V) is higher than the potential difference V1 by a potential difference $\Delta$V, that is assumed to be or equivalent to the difference among the voltages on the common connection lines. In this case, the liquid crystal element to which the potential difference V2 is applied shows a reflectance ratio Yb+$\Delta$Y2 ($\Delta$Y2>>0 V), which is greatly different from the reflectance ratio Yb. Thus, when the liquid crystal display panel operates in the normally white display mode, the luminance of the black image is nonuniform, due to the difference among the voltages on the common connection lines COM. The nonuniform of the luminance in the black state may cause flickers, thereby deteriorating the display quality.

In the display device 1 according to this embodiment, the frame rate is set to less than 60 Hz during the displaying of an image. This makes it possible to decrease the power consumption. Since the luminance in the white state is substantially uniform, as described above, a prominent level of flickers do not appear on the image display surface, even at a frame rate of less than 60 Hz.

In summary, the liquid crystal display panel of this embodiment displays an image by employing the area coverage modulation and in the normally black mode. The area coverage modulation functions as generating a gray-scale image by using binary values of black and white without using any halftone values. The normally black mode functions as providing stable luminance without being affected by the difference among the applied voltages for a white state. Therefore, for example, when the driver applies a constant voltage to the common connection lines COM during the frame inversion driving, the 1H inversion driving, or some other driving, even if the voltages applied to the liquid crystal layer for each pixel 20A differ from one another, the liquid crystal display panel provides stable luminance. Because of this stable luminance, it is possible to suppress the occurrence of flickers on the image display surface, even when the liquid crystal panel is driven at a low frequency. Thus, this embodiment achieves low power consumption while suppressing the occurrence of flickers.

Figure 11:
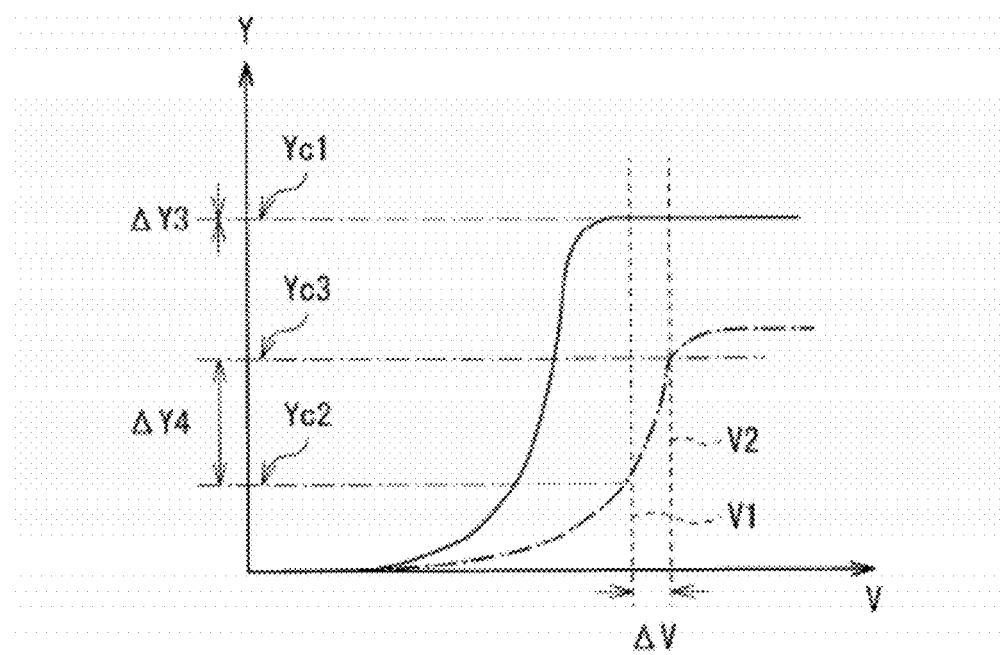
FIG. 11 is a view depicting an example of a relationship between an applied voltage and a reflectance ratio, when the light scattering layer shown in FIG. 1 is removed from the display device.
Figure 12:
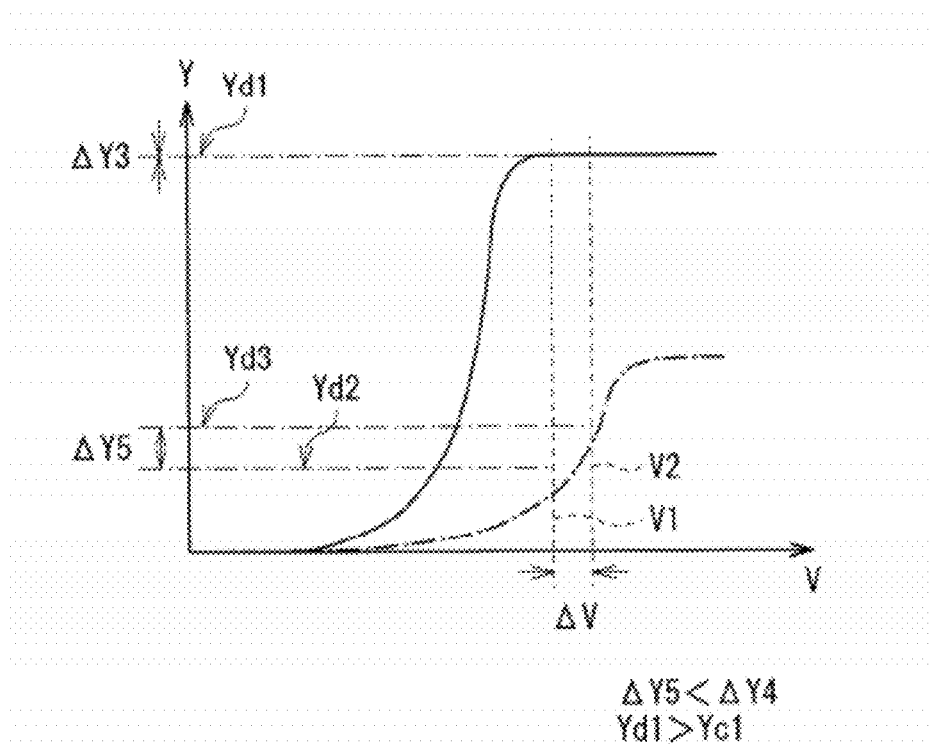
FIG. 12 is a view depicting an example of a relationship between an applied voltage and a reflectance ratio in the display device shown in FIG. 1.

FIG. 11 schematically shows a relationship between an applied voltage and display luminance in the liquid crystal display panel from which the light scattering layers 25 and 26 are removed. FIG. 12 schematically shows a relationship between an applied voltage and display luminance in the liquid crystal display panel in which the light scattering layers 25 and 26 are arranged at above-described locations. In each of FIGS. 11 and 12, a solid line represents the resultant relationship, when a user views the image display surface at a polar angle of 45° or more and in the orientation of the main viewing angle. Meanwhile, in each of FIGS. 11 and 12, a dashed line represents the resultant relationship, when a user views the image display surface at a polar angle of 45° or more and in an orientation of the sum of the main viewing angle and 60°.

It can be seen from FIGS. 11 and 12 that the arrangement of the light scattering layers 25 and 26 causes the luminance in the orientation of the main viewing angle to be increased from values Yc1 to Yd1. Furthermore, it can also be seen from FIGS. 11 and 12 that the arrangement of the light scattering layers 25 and 26 causes the difference of the luminances in a white state in an orientation of a different angle from the main viewing angle, which results from the difference among the voltages on the common connection lines COM, to be decreased from values $\Delta$Y4 to $\Delta$Y5. Thus, in comparison with another liquid crystal display panel without the light scattering layers 25 and 26, the liquid crystal display panel of this embodiment with the light scattering layers 25 and 26 provides greater luminance in the orientation of the main viewing angle, as well as less prominent flickers in an orientation of a different angle from the main viewing angle.

Consequently, with the arrangement of the light scattering layers 25 and 26, this embodiment increases the luminance in the orientation of the main viewing angle, and makes flickers less prominent in an orientation of a different angle from the main viewing angle.

Modification Example

Figure 13A:
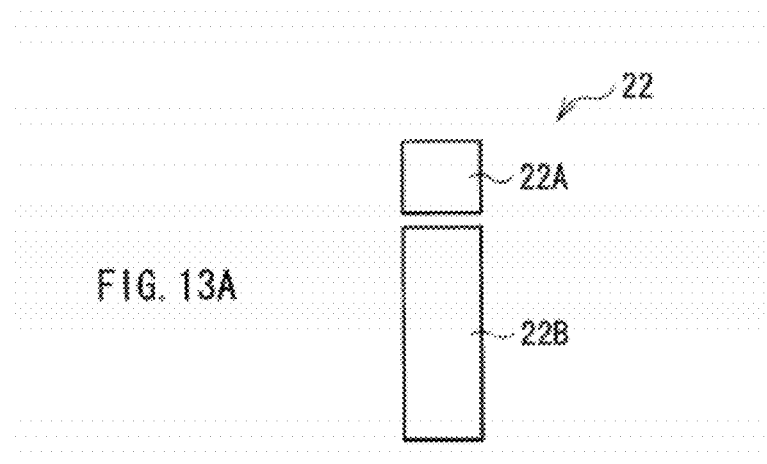
FIGS. 13A, 13B, and 13C are views depicting respective other examples of a lateral structure of each pixel electrode in the display device shown in FIG. 1.
Figure 13B:
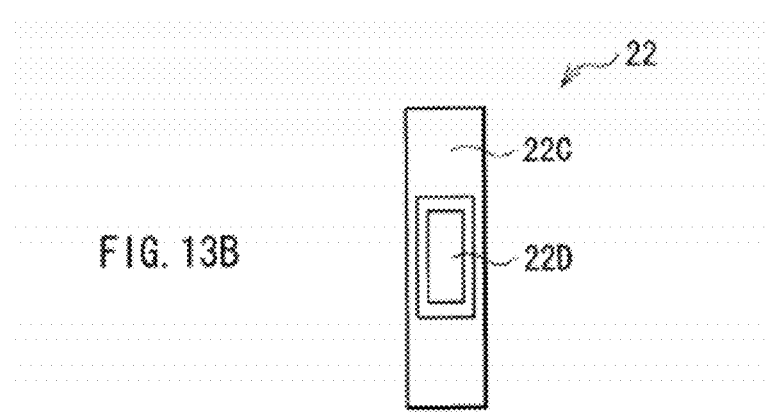
Figure 13C:
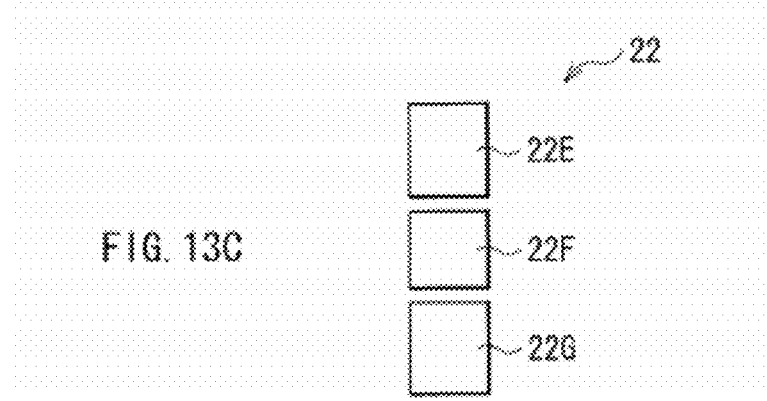

In the embodiment described above, the reflective electrode layer 13 includes the multiple pixel electrodes, and the transparent electrode layer 22 serves as a common electrode. However, contrarily, the reflective electrode layer 13 may serve as a common electrode, and the transparent electrode layer 22 may include multiple pixel electrodes. In this case, for example, each pixel electrode includes multiple partial electrodes. As shown in FIG. 13A, for example, each pixel electrode is constituted by arranging, in a side-by-side fashion, a partial electrode 22A having a relatively small area, and a partial electrode 22B having a relatively large area. Alternatively, as shown in FIG. 13B, for example, each pixel electrode may be constituted by a partial electrode 22C having an opening, and a partial electrode 22D disposed in the opening of the partial electrode 22C. Alternatively, as shown in FIG. 13C, for example, each pixel electrode may be constituted by arranging, in a line, partial electrodes 22E, 22F and 22G having the same area. In this case, the driver circuit 40 selects the partial electrodes of each pixel electrode in the transparent electrode layer 22, instead of those in the reflective electrode layer 13.

Figure 14:
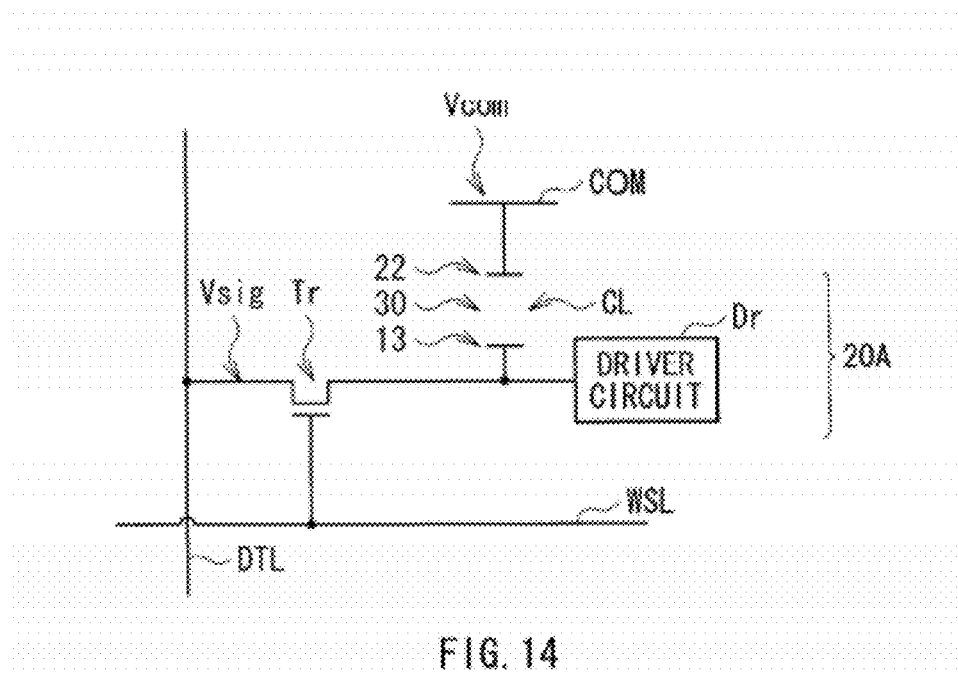
FIG. 14 is a circuit diagram depicting a modification example of a structure of a pixel in the display device shown in FIG. 1.

In the embodiment described above, each pixel 20A may employ the memory-in-pixel (MIP) technique. As shown in FIG. 14, for example, each pixel 20A may include a driver circuit Dr, the output pin of which is connected to a connection node between the transistor Tr and the liquid crystal element CL. This driver circuit Dr serves as a driver circuit for AC inversion which is provided with a built-in memory. For example, before displaying a static image on the image display surface, the driver circuit Dr stores a signal voltage Vsig corresponding to this static image in the built-in memory, and performs the frame inversion driving, the 1H inversion driving, or the like during the displaying of the static image. In this example, the driver circuit 40 does not drive the pixels 20A through the scan lines WSL and the signal lines DTL. This makes it possible to decrease the power consumption by that for the scan lines WSL and the signal line DTL.

2. Application Example

Figure 15:
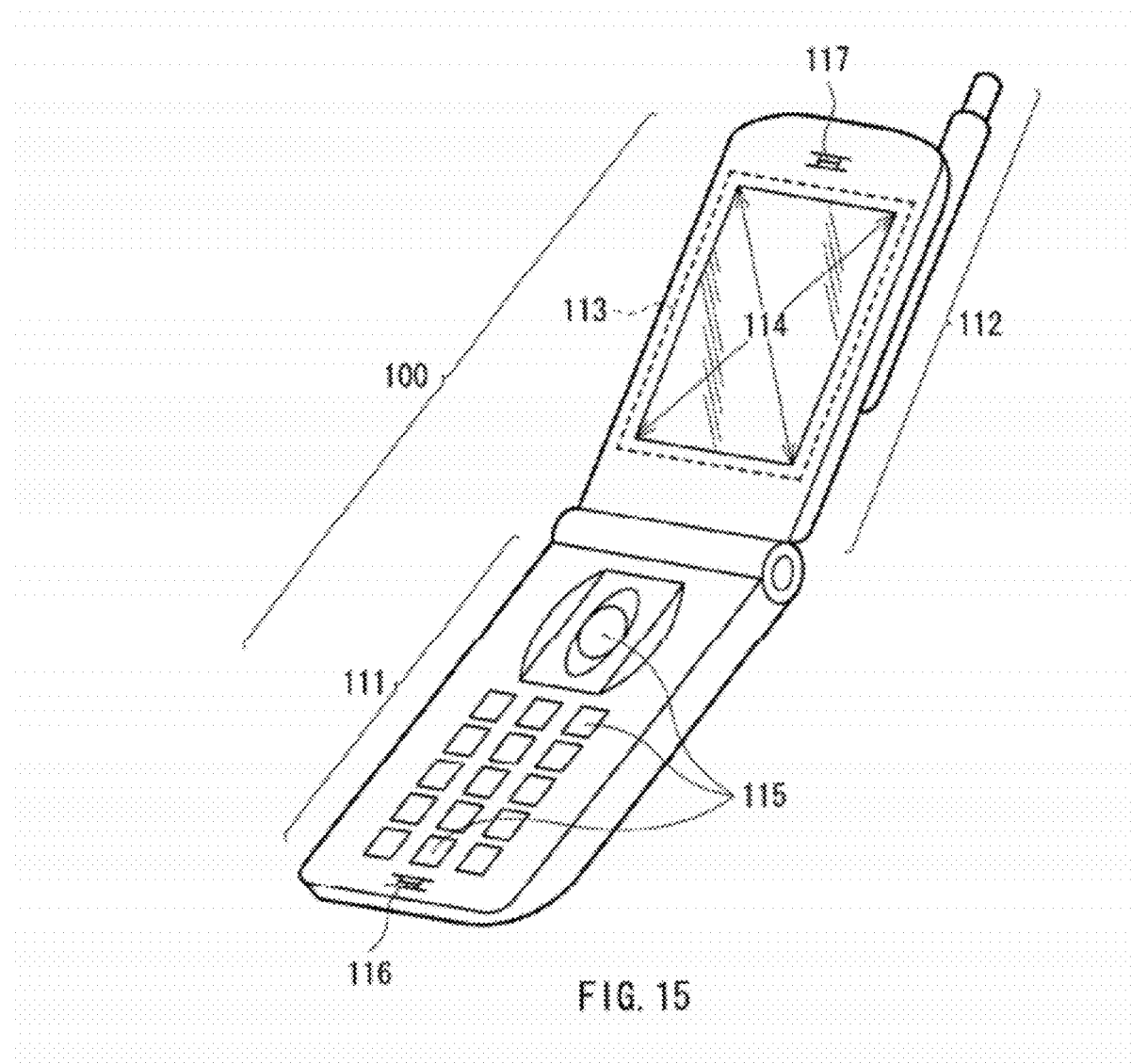
FIG. 15 is a schematic perspective view depicting an example of a structure of an electronic apparatus according to an application example.

Next, a description will be given below of an application example for the display device 1 according to the above-described embodiment and modification example. FIG. 15 is a schematic view illustrating an example of a structure of an electronic apparatus 100 according to this application example. The electronic apparatus 100 is a portable phone, and includes, for example, a main body section 111, and a display body section 112 coupled to the main body section 111 in an openable and closable manner, as shown in FIG. 15. The main body section 111 is provided with operation buttons 115 and a microphone section 116. The display body section 112 is provided with a display device 113, and a speaker section 117. This display device 113 is configured to display various indications regarding the telephone communication on a display screen 114 thereof. Furthermore, the electronic apparatus 100 includes a control section (not shown) that controls the operation of the display device 113. This control section is provided in the main body section 111 or the display body section 112, as either part of a controller having control over the whole electronic apparatus 100 or independently of this controller.

The display device 113 has the same structure as the display device 1 according to the above-described embodiment and modification example. Therefore, the display device 113 achieves low power consumption while suppressing the occurrence of flickers.

Note that an example of an electronic apparatus to which the display device 1 according to the above-described embodiment and modification example is to be applied includes, in addition to the above portable phone, a personal computer, a liquid crystal television, a video tape recorder of a viewfinder or direct-view type, a car navigation system, a pager, an electronic organizer, a word processor, a work station, a video telephone, and a POS terminal.

Accordingly, it is possible to achieve at least the following configurations from the above-described example embodiments and the modifications of the disclosure.

(1) A display device, including:
 a liquid crystal display panel; and
 a driver circuit driving the liquid crystal display panel,
 the liquid crystal display panel including a liquid crystal layer, a plurality of pixel electrodes, a phase difference layer, and a polarizing plate, the pixel electrodes being provided in a region facing the liquid crystal layer and applying a voltage to the liquid crystal layer, and the phase difference layer and the polarizing plate being provided on a side, relative to the liquid crystal layer, which ambient light enters,
  wherein each of the pixel electrodes includes a plurality of partial electrodes, and
 the driver circuit selects one or more partial electrodes from the partial electrodes to which a constant voltage is to be applied in accordance with an image signal, the constant voltage causing the liquid crystal display panel to be in a white state, and performs gray-scale display by modulating lighting area of each pixel at a frame rate of less than 60 Hz.
(2) The display device according to (1), wherein the frame rate is equal to or more than 0.1 Hz.
(3) The display device according to (1) or (2), wherein
 the liquid crystal display panel includes an anisotropic scattering layer provided on the side, relative to the liquid crystal layer, which the ambient light enters, and
 an orientation, a reflectance ratio of which has a highest value due to an effect of the anisotropic scattering layer, of the liquid crystal display panel is aligned with an orientation of a main viewing angle.
(4) The display device according to (3), wherein the liquid crystal display panel is configured to allow an orientation, in which a flicker is most prominent without provision of the anisotropic scattering layer, to be different from the orientation of the main viewing angle.

(5) The display device according to any one of (1) to (4), further including a translucent common electrode provided on the side, relative to the liquid crystal layer, which the ambient light enters and facing the pixel electrodes across the liquid crystal layer,
 wherein the pixel electrodes are provided on an opposite side, relative to the liquid crystal layer, which the ambient light enters, and serve as a reflection layer that reflects the ambient light incident from the liquid crystal layer toward the liquid crystal layer.
(6) The display device according to any one of (1) to (4), further including a reflective common electrode provided on an opposite side, relative to the liquid crystal layer, which the ambient light enters, and facing the pixel electrodes across the liquid crystal layer,
 wherein the pixel electrodes are provided on the side, relative to the liquid crystal layer, which the ambient light enters, and include a material transparent to the ambient light incident from the liquid crystal layer.
(7) An electronic apparatus with a display device, the display device including:
 a liquid crystal display panel; and
 a driver circuit driving the liquid crystal display panel,
 the liquid crystal display panel including a liquid crystal layer, a plurality of pixel electrodes, a phase difference layer, and a polarizing plate, the pixel electrodes being provided in a region facing the liquid crystal layer and applying a voltage to the liquid crystal layer, and the phase difference layer and the polarizing plate being provided on a side, relative to the liquid crystal layer, which ambient light enters,
  wherein each of the pixel electrodes includes a plurality of partial electrodes, and
 the driver circuit selects one or more partial electrodes from the partial electrodes to which a constant voltage is to be applied in accordance with an image signal, the constant voltage causing the liquid crystal display panel to be in a white state, and performs gray-scale display by modulating lighting area of each pixel at a frame rate of less than 60 Hz.

The present disclosure contains subject matter related to that disclosed in Japanese Priority Patent Application JP 2011-136568 filed in the Japan Patent Office on Jun. 20, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. A display device, comprising:
 a liquid crystal display panel; and
 a driver circuit driving the liquid crystal display panel,
 the liquid crystal display panel including a liquid crystal layer, a plurality of pixel electrodes, a phase difference layer, and a polarizing plate, the pixel electrodes being provided in a region facing the liquid crystal layer and applying a voltage to the liquid crystal layer, and the phase difference layer and the polarizing plate being provided on a side, relative to the liquid crystal layer, which ambient light enters,
 wherein each of the pixel electrodes includes a plurality of partial electrodes, and
 the driver circuit selects one or more partial electrodes from the partial electrodes to which a constant voltage is to be applied in accordance with an image signal, the constant voltage causing the liquid crystal display panel to be in a white state, and performs gray-scale display by modulating lighting area of each pixel at a frame rate of less than 60 Hz.

2. The display device according to claim 1, wherein the frame rate is equal to or more than 0.1 Hz.

3. The display device according to claim 1, wherein
the liquid crystal display panel includes an anisotropic scattering layer provided on the side, relative to the liquid crystal layer, which the ambient light enters, and
an orientation, a reflectance ratio of which has a highest value due to an effect of the anisotropic scattering layer, of the liquid crystal display panel is aligned with an orientation of a main viewing angle.

4. The display device according to claim 3, wherein the liquid crystal display panel is configured to allow an orientation, in which a flicker is most prominent without provision of the anisotropic scattering layer, to be different from the orientation of the main viewing angle.

5. The display device according to claim 1, further comprising a translucent common electrode provided on the side, relative to the liquid crystal layer, which the ambient light enters and facing the pixel electrodes across the liquid crystal layer,
wherein the pixel electrodes are provided on a side, relative to the liquid crystal layer, opposite to the side which the ambient light enters, and serve as a reflection layer that reflects the ambient light incident from the liquid crystal layer toward the liquid crystal layer.

6. The display device according to claim 1, further comprising a reflective common electrode provided on a side, relative to the liquid crystal layer, opposite to the side which the ambient light enters, and facing the pixel electrodes across the liquid crystal layer,
wherein the pixel electrodes are provided on the side, relative to the liquid crystal layer, which the ambient light enters, and include a material transparent to the ambient light incident from the liquid crystal layer.

7. An electronic apparatus with a display device, the display device comprising:
a liquid crystal display panel; and
a driver circuit driving the liquid crystal display panel,
the liquid crystal display panel including a liquid crystal layer, a plurality of pixel electrodes, a phase difference layer, and a polarizing plate, the pixel electrodes being provided in a region facing the liquid crystal layer and applying a voltage to the liquid crystal layer, and the phase difference layer and the polarizing plate being provided on a side, relative to the liquid crystal layer, which ambient light enters,
wherein each of the pixel electrodes includes a plurality of partial electrodes, and
the driver circuit selects one or more partial electrodes from the partial electrodes to which a constant voltage is to be applied in accordance with an image signal, the constant voltage causing the liquid crystal display panel to be in a white state, and performs gray-scale display by modulating lighting area of each pixel at a frame rate of less than 60 Hz.

* * * * *